Figure 1:
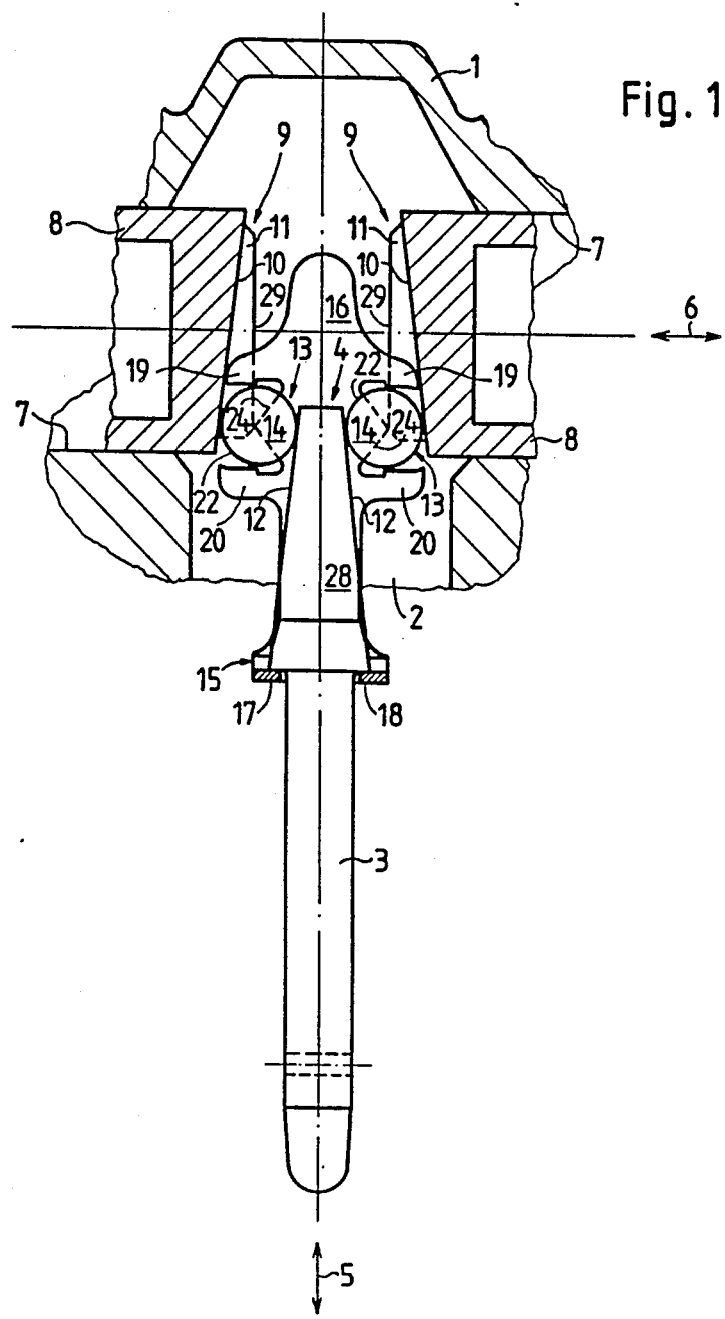

United States Patent [19]
Fischenich

[11] Patent Number: 4,765,447
[45] Date of Patent: Aug. 23, 1988

[54] WEDGE BRAKE ACTIVATING DEVICE

[75] Inventor: Bernhard A. Fischenich, Alzenau, Fed. Rep. of Germany

[73] Assignee: Rockwell-Golde GmbH, Fed. Rep. of Germany

[21] Appl. No.: 78,748

[22] PCT Filed: Nov. 8, 1986

[86] PCT No.: PCT/DE86/00454

§ 371 Date: Jun. 29, 1987

§ 102(e) Date: Jun. 29, 1987

[87] PCT Pub. No.: WO87/03059

PCT Pub. Date: May 21, 1987

[30] Foreign Application Priority Data

Nov. 16, 1985 [DE] Fed. Rep. of Germany ....... 3540671

[51] Int. Cl.⁴ .............................................. F16D 65/22
[52] U.S. Cl. ...................... 188/343; 74/110
[58] Field of Search .......... 188/78, 72.7, 343; 74/110

[56] References Cited

U.S. PATENT DOCUMENTS

| | | | |
|---|---|---|---|
| 3,326,330 | 6/1967 | Holt et al. | 188/343 |
| 4,549,442 | 10/1985 | Hans et al. | 74/110 |
| 4,558,768 | 12/1985 | Brandenstein et al. | 188/343 |

FOREIGN PATENT DOCUMENTS

| | | |
|---|---|---|
| 1923232 | 1/1970 | Fed. Rep. of Germany . |
| 2147435 | 3/1973 | Fed. Rep. of Germany . |
| 3215904 | 11/1983 | Fed. Rep. of Germany . |

*Primary Examiner*—Andres Kashnikow
*Assistant Examiner*—Mark T. Le

[57] ABSTRACT

In the case of a wedge brake activating device for drum brakes of vehicles, the guidance of the rollers (13) contained in a roller cage (15)—which provide the positive [frictional] engagement between the wedge surfaces (12) and the slant surfaces (10)—located in the slots (9) of the push tappets (8) activating the brake shoes—is established exactly and with low friction at low manufacturing costs for the roller cage (15). In order to accomplish this, the rollers (13)—on the one hand—are guided tangentially between guidance surfaces (22) located on guidance protrusions (19, 20) of the roller cage (15) at their cylindrical circumferential surfaces (22), and they are guided axially—on the other hand—between axial guidance sections (24) located on the roller cage (15) and the sidewalls (11) of the slots (9), and the width of the expanding wedge (4) and the corresponding dimensions of the roller cage are in a determined way coordinated to the length of the rollers (13).

1 Claim, 5 Drawing Sheets

WEDGE BRAKE ACTIVATING DEVICE

The invention relates to a wedge brake activating device for drum brakes of vehicles having a housing which accepts an expanding wedge which can be activated in its longitudinal direction and which protrudes into a recess of the housing, in which two pressure tappets are located at both sides of the expanding wedge in transverse direction to the expanding wedge in the housing, and are axially aligned relative to each other, and activate the brake shoes by means of displacements caused by the expanding wedge between each of the two wedge surfaces and a slant surface of the adjacent push tappet which is parallel to the wedge surface. A cylindrical roller is frictionally connected, guided with its front surfaces on the side surfaces of a slot in the push tappet which forms the slant surfaces of the push tappet. Both rollers are guided in a roller cage which is arranged with longitudinal sliding motion on the expanding wedge and between the side surfaces of the slots. The roller cage is provided with two legs running parallel to the traverse direction, on which guide protrusions are arranged, bent on the inside at right angles, which run in opposite direction in pairs, and which guide the two rollers at diametrically opposite locations tangentially at their extreme outside ends at a distance which is smaller than the diameter of the rollers. An axial guide section is formed on the leg, between the guide protrusions of each protrusion pair, at the same level as the surfaces of the internal walls of the legs, and at the front surface of the roller adjacent to the wedge surface.

In the case of a known wedge brake activating device of this kind (DE-OS No. 32 15 904), the guide protrusions designated there as radial guide sections are arranged and designed in such a way that they closely "hug" the external edges of the rollers, i.e. the rounded circumferential edges between the cylindrical circumferential surfaces of the rollers and their plane front surfaces. This is done in order to guide both rollers axially at their external edges, and in order to prevent slant positioning in the roller cage.

However, by guiding at the external edges of the rollers, neither a satisfactory axial roller guidance nor a sufficient tangential guidance is achieved. In addition, a close fit over the rounded external roller edges is difficult to achieve in terms of manufacturing technology, since the mere metal displacement done within the framework of an additional metal shaping process (by pressing a V-shaped groove into the guide protrusions) does not necessarily provide a concave rounding cavity in the guide protrusions which corresponds exactly to the convex rounded edges of the rollers. The task is even more difficult in view of the fact that there must be a bent on at least one guide protrusion of each guide protrusion pair, in order to prevent the rollers from falling out, i.e. in order to make the distance of the external ends of the guide protrusions smaller than the diameter of the rollers.

While in the case of the known device the above mentioned axial guide sections are provided on the legs of the roller cage—providing axial guidance of the rollers on each side at three locations of their circumference—the axial guidance of the rollers is now "redundantly determined". This "redundant determination" has the consequence that for each roller the mutual distance of the two axial guidance sections and the distance of the interacting guidance protrusion pairs must be coordinated axactly with the length of the rollers, in order to achieve an axial guidance at three locations on each side of the rollers, which is difficult, however, in view of the unavoidable manufacturing tolerances. This coordination of the manufacturing tolerances is also difficult in view of the requirement that the distances between the guidance protrusions (which always form a pair) have to be coordinated with the roller diameter, and the concave rounded cavities on the guidance protrusions have to be coordinated with the external roller edge radius, and that this coordination has to be maintained during mass production.

Even if this should be possible, each side of the roller would be—in view of the axial roller guidance at three locations—in a wear-prone friction engagement with the respective surfaces of the roller cage.

This invention has the task to provide a wedge brake activating device where the rollers—with low manufacturing costs by comparison as far as the roller cage is concerned—work with precision and with low friction.

On the basis of a wedge brake activating device of the type mentioned before, the task/problem is solved in the way that the guidance protrusions have guidance surfaces that are essentially parallel to the center axes of the rollers, which are at least in part assigned to the cylindrical circumferential surfaces of the rollers, and that the axial guidance sections are reduced in their effective guidance saurface by recesses starting at the guidance protrusions, and that the distance of the two external surfaces of the expanding wedge facing the two internal walls of the legs is somewhat greater than the length of the rollers, and that the distance of the two internal walls of the legs—at least in the area of the rollers—is equal to or somewhat smaller than the length of the rollers—when the rollers are not inserted in the roller cage and when the expanding wedge is not inserted.

As far as the wedge brake activating device according to the invention is concerned, circumferential rounding cavities for the external roller edges involving costly manufacturing operations do not have to be provided, since the guidance protrusions with their simple guide surfaces provide exclusively for the tangential guidance of the rollers. The axial guidance of the rollers is provided by the axial guidance sections, whose surface size is reduced by recesses in order to reduce friction, and which allow at the same time—with advantage as far as manufacturing is concerned—a bending by right angle of the guidance protrusions towards the inside without deformation effects on the axial guidance sections.

By coordinating the above mentioned distance measurements with the length of the rollers it is made possible that—upon inserting the expanding wedge into the roller cage—a slight increase occurs of the distance between the two internal walls of the legs, which lifts the axial guidance sections from the front surface of the rollers. The axial guidance of the rollers is therefore provided essentially by the side surfaces of the slots located in the push tappet. During operation, the rollers—in axial limit positions—can only make frictional contact with an axial guidance section if there is a corresponding relative position between the rollers, the roller cage and the slots in the tappets. The friction between the roller cage and the rollers is therefore substantially reduced, without giving up the exact tangential and axial guidance of the rollers.

In order to achieve axial guidance section of a surface as small as possible, it is of advantage if—by means of recesses—axial guidance sections in the triangular shape of a tongue are formed, with the tip of the tongue pointing to the center of the front surfaces of the rollers.

In order to reduce the friction between the roller cage—i.e. the two inner walls of the legs—and the expanding wedge, i.e. the two external surfaces of the expanding wedge facing the internal walls of the legs, it is of advantage to arrange thin layers of an anti-friction plastic material between the external surfaces of the expanding wedge and the internals walls of the legs.

These thin layers can be provided in various ways. For practical purposes the arrangement can be made in such a way that in longitudinal direction in the internal walls of the legs keyways, recesses etc. are provided, in which suitably shaped plastic strips are held. In an alternative version, there could at least one bore hole [through-hole] in the expanding wedge—parallel to the axes of the rollers—in which a plastic rod is inserted which on both sides protrudes somewhat above the external surfaces.

The above mentioned keyays arranged in longitudinal direction may of course also be provided at the external surfaces of the expanding wedge facing the internal walls of the legs of the roller cage. In this case the plastic strips protrude somewhat above these external surfaces. In any case, the above mentioned plastic elements prevent metallic friction between the expanding wedge and the roller cage.

Further details of the ivention are explained on the basis of the drawings and examples.

Figure 4:
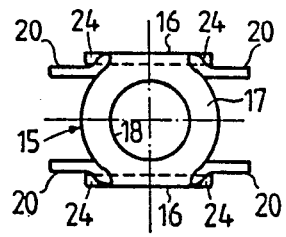
Figure 5:
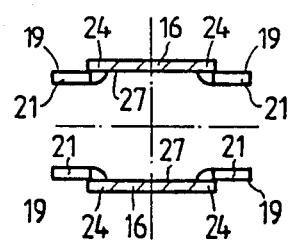
Figure 2:
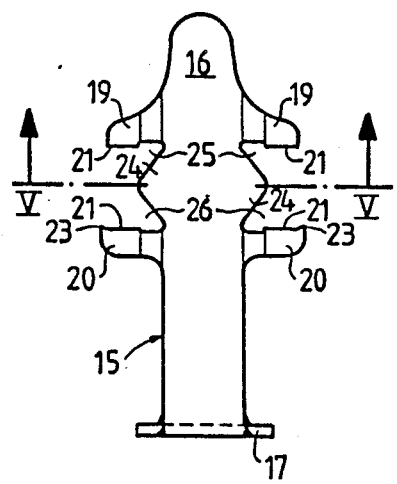
Figure 3:
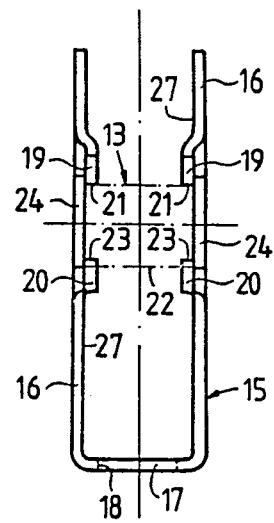
Figure 7:
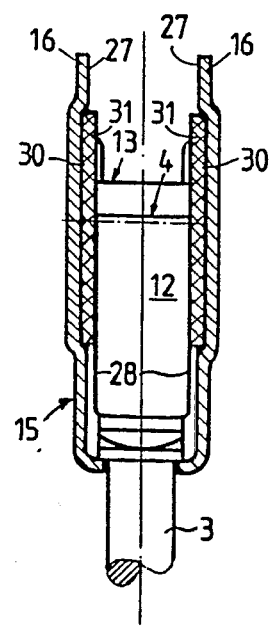
Figure 6:
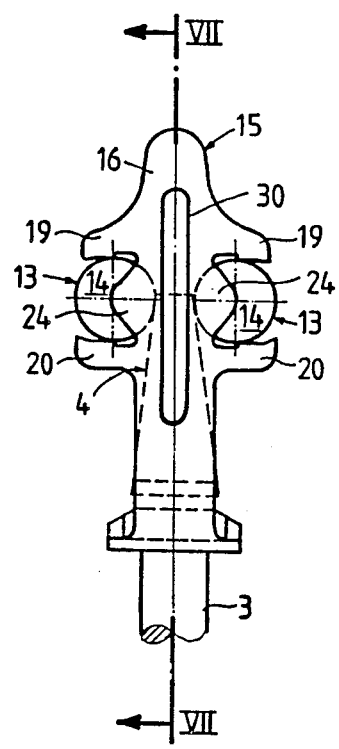
Figure 9:
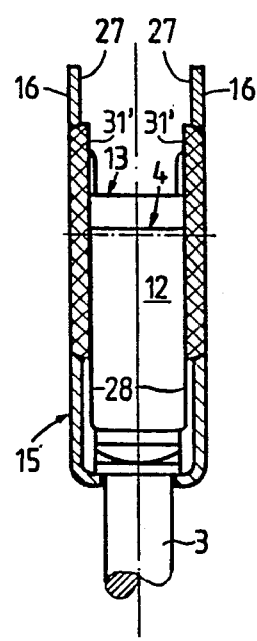
Figure 8:
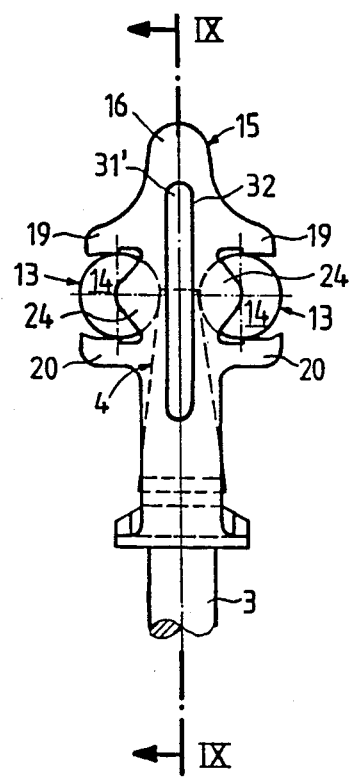
Figure 11:
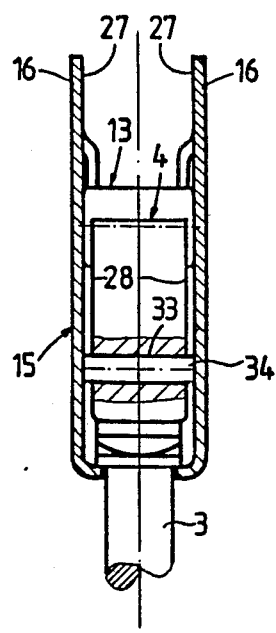
Figure 10:
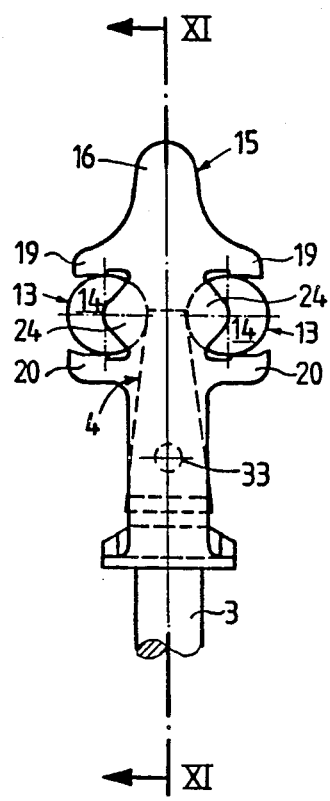

The drawings show:

FIG. 1 a partial section though the vertical center plane of the wedge brake activating device, FIG. 2 a main view of the roller cage, FIG. 3 a lateral view of the roller cage, FIG. 4 the bottom view of the roller cage, FIG. 5 a section through the roller cage along line V—V in FIG. 2, FIG. 6 a main view of a modified version of the roller cage (modified to reduce friction), with inserted rollers and inserted expanding wedge, FIG. 7 a section along the line VII—VII in FIG. 6, FIG. 8 a main view of another version of the roller cage modified for reduction of friction, with inserted rollers and inserted expansion wedge, FIG. 9 a section along the line IX—IX of FIG. 8, FIG. 10 a main view of yet another version of the roller cage modified for reduction of friction, with inserted rollers and inserted expansion wedge, FIG. 11 a section along the line XI—XI of FIG. 10.

FIG. 1 shows the housing 1 of the wedge brake activating device, which has a housing recess 2, into which protrudes from the bottom the expanding wedge 4, attached to the end of an activating rod 3, which can be moved in its longitiduinal direction indicated by an arrow 5 in order to activate the brake (brake not shown in the drawing). In a transverse direction indicated by another arrow 6, two opposite guide bore holes 7 located on a flush line go into the housing recess 2, and located in these guide bore holes 7 there is provided a cylindrical push tappet 8, which can be moved back and forth, but which cannot be rotated.

The push tappets 8 with their internal ends are inside the housing recess 2, while their "broken-off" external ends are connected in the usual way with the ends of the brake shoes (not shown) of a vehicle drum brake.

The opposite internal ends of the push tappets 8 are each provided in mirror-image-like fashion with a slot 9, which is limited at the bottom of the slot by a slant surface 10 and laterally by the sidewalls 11, of which only the rear sidewall is shown in FIG. 1. The slant surfaces 10 are aligned plane-parallel with the facing wedge surfaces 12 of the expanding wedge 4.

A cylindrical roller 13 is arranged between each wedge surface 12 and a slant surface 10, which upon brake activation of the expanding wedge 4, i.e. with an upward movement of the expanding wedge (with reference to the representation of the drawing), establishes a frictional connection between the above mentioned surfaces. The two rollers 13 are guided with their two front surfaces 14 between the sidewalls 11 of the respective slot 9 and can be moved in longitudinal direction 5. In addition the two rollers 13 are in guided position in a roller cage 15 (described in detail further below), which has sliding motion in longitudinal direction 5 and is arranged on the expanding wedge 4 and on its activating rod 3. The roller cage 15 has two legs 16 running parallel in transverse direction 6, which at their lower end (with reference to the representation of the drawing) are connected by a link 17 to form a U-shaped element open at the top, as for example shown in FIG. 3. In the link 17 is a through bore hole 18 for the activating rod 3. In the example shown in the drawing, the roller cage 15 is stamped from a suitable sheet metal of constant thickness or cut, and then bent into U-shape.

As shown in FIGS. 1 to 5, starting from the legs 16 and going in the opposite direction are in pairs guidance protrusions 19 and 20, which are bent at right angle towards the inside and which—like the rollers 13—are also guided between the sidewalls 11 of the slots 9, moveable in longitudinal direction 5.

The guidance protrusions have above their material thickness guidance surfaces 21 aligned parallel to the center axes of the rollers 13, which guide the rollers 13 at diametrically opposed locations with little play tangentially at [against] the cylindrical circumferential surfaces 22. In order to clearly illustrate this situation, a roller 13 is shown in FIG. 3 with dash/dot lines. The guidance surfaces 21 have pair-wise a constant distance and are aligned parallel to the transverse direction 6. In the example shown (FIG. 2), the guidance protrusions 20 have at the external end of their guidance surfaces 21 inward-pointing noses 23, whose distance to the opposite external end of the guidance protrusions 19 is smaller than the roller diameter, which prevents the rollers 13 from falling out of the roller cage 15 towards the outside in transverse direction 6.

Between each guidance protrusion pair 19, 20 is an axial guidance section 24, which has a triangular-shaped tongue-shape (in view of the recesses 25 and 26 provided during the stamping or fine-cutting fabrication of the roller cage 15), whose tip of the tongue points towards the center of the front surfaces 14 of the rollers 13, as shown in FIG. 1. The recesses 25, 26 reduce—on the one hand—the internal guidance surfaces of the axial guidance setions 24 assigned to the front surfaces 14, and they allow—on the other hand—the described and shown bending of the guidance protrusions 19, 20 towards the inside without resulting in deformation in the area of the axial guidance Sections 24.

The recesses 25, 26 also limit towards the inside the effective length of the guidance surfaces 21.

The axial guidance sections 24 with their internal guidance surfaces assigned to the front surfaces 14 of the rollers 13 have surface contact with the internal walls 27 of the legs 16 as shown in particular in FIG. 5. This means that the mutual distance of the pair-wise opposed axial guidance sections 24 is equal to the distance of the internal walls 27 of the legs 16. This distance—in the event that the rollers 13 are not inserted in the roller cage 15 and that the expanding wedge 4 is not inserted in the roller cage—is equal to or slightly smaller than the length of the rollers 13.

However, the width of the expanding wedge 4—i.e. the distance of the two external surfaces 28 of the expanding wedge facing the internal walls 27 of the legs 16—is somewhat greater than the length of the rollers 13.

When the unit consisting of the expanding wedge 4 and the permanently connected activating rod 3, the roller cage 15 and the rollers 13 is preassembled, the roller cage 15 with its through bore hole 18 is first slid over the activating rod 3 until contact is made with the expanding wedge 4. The external surfaces 28 are now in contact with the internal walls 27, and in view of the indicated dimensioning of the distance the legs 16 are bent slightly outward. In order to arrange (insert) the rollers 13, the legs 16 are bent apart elastically a few millimeters, so that the rollers 13 can be inserted from the sides between the guidance protrusions 19, 20 and the axial guidance sections 24.

Then one allows the legs 16 to spring back until the internal walls 27 make contact with the external surfaces 28. In this position, the rollers 13 have slight axial play between the axial guidance sections 24.

Axial guidance of the rollers 13 and tangential guidance of the rollers are clearly separated. Axial guidance is provided by the axial guidance sections 24—and after the insertion of the preassembled wedge unit between the push tappets 8—additionally by the sidewalls 11 of the slots 9. However, the guidance protrusions 19, 20 with their guidance surfaces 21 have the exclusive task of guiding tangentially the rollers 13 at their cylindrical circumferential surfaces 23.

The bending of the guidance protrusions 19, 20 is dimensioned in such a way that its extent, i.e. the distance between its surfaces pointing towards the outside, is slightly smaller than the length of the rollers 13, and is also of course smaller than the distance of the sidewalls 11 between which they can be moved in longitudinal direction 5. The external measurement of the legs 16 and therefore the external measurement of the axial guidance sections lying in the same plane is greater, however, than the distance of the sidewalls 11, to that these areas of the roller cage 15 cannot enter into the slots 9. The tips of the tongues of the axial guidance sections 24 are between the front surfaces 29 of the push tappets 8, which are plane-parallel relative to each other and at right angle to the transverse direction 6, as shown in FIG. 1.

FIG. 1 shows the relative position of the parts of the device at the start of the brake activation. With the progress of the brake activation, the expanding wedge 4 penetrates further between the rollers 13, which make contact with the wedge surfaces 12 as well as with the slant surfaces 10.

During this process, the roller cage 15 also moves along in the direction of activation. After completion of the brake activation, the parts of the device move in opposite direction until finally the frictional engagement between the wedge surfaces 12, the rollers 13 and the slant surfaces 10 is eliminated.

In the examples shown in the FIGS. 6 to 11, measures have been taken in order to reduce the friction between the expanding wedge 4 and the roller cage 15. In the version according to the FIGS. 6 and 7, "pushed out areas" 30 are located in the legs 16 in longitudinal direction and opposite each other, which start from the internal walls 27 and serve for holding suitably shaped plastic strips 31. The surfaces of the plastic strips 31 facing the external surfaces 28 of the expanding wedge 4 protrude somewhat over the internal walls 27. The inserted expanding wedge 4 is therefore not in contact with the internal walls 27 but with the plastic strips 31, which reduces the friction in the event of relative movement between the expanding wedge 4 and the roller cage 15. Otherwise this version of the device corresponds to the example which was described with reference to the FIGS. 1 to 5.

This situation is similarly true for the example represented in the FIGS. 8 to 9. Here—instead of the "pushed out areas" 30—keyways 32 going through the material thickness are provided in the legs 16. The keyways 32 have slanted wall surfaces which narrow from the inside towards the outside, so that the plastic strips 31' (correspondingly slanted at their outside surfaces) are retained from the inside in the keyways 32 after insertion.

In this case, too, the plastic strips 31' with their internal surfaces (in contact with the external surfaces 28 of the expanding wedge 4) protrude somewhat over the internal walls 27 of the legs 16, which is shown with some exaggeration in the representation of the drawing.

And finally—as far as the example shown in the FIGS. 10 and 11 is concerned—there is a through bore hole 33 in the expanding wedge parallel to the axes of the rollers 13, into which is inserted a plastic rod 34 which protrudes on both sides somewhat over the external surfaces 28 of the expanding wedge 4. In this version, too, a direct metallic friction contact between the external surfaces 28 and the internal walls 27 is avoided.

I claim:

1. In a wedge device adapted for expanding brakes of motor vehicles including a housing, a longitudinal wedge member that has a pair of wedge surfaces and a pair of external surfaces interconnecting said wedge surfaces and protrudes into a recess of the housing and two push tappets, one on each side of said wedge, axially aligned with each other and supported by said housing, each said tappet member having a side slant surface in the form of a slot which is parallel to the adjacent wedge surface of said wedge member, cylindrical rollers having front and rear surfaces, and a roller cage for guiding said rollers in a longitudinal direction along the length of said wedge, each said rollers having two legs transverse to said wedge and having protrusions which guide said rollers tangentially at diametrically opposed locations along the axial direction of said tappets, the improvement comprising:

guidance protrusions having surfaces which are aligned in parallel with the center axis of the rollers from which they project and having external ends whose distance between said external ends is smaller than the diameter of said rollers;

triangular tongues between said guidance protrusions with the tip of the tongue being parallel to the front surface of said rollers;

said wedge being provided with a bore which extends in a direction parallel to the axis of said rollers and a plastic rod which is inserted into said bore, said plastic rod protruding beyond the external surfaces of said wedge.

* * * * *